(12) United States Patent
Bose et al.

(10) Patent No.: US 8,091,050 B2
(45) Date of Patent: Jan. 3, 2012

(54) MODELING SYSTEM-LEVEL EFFECTS OF SOFT ERRORS

(75) Inventors: Pradip Bose, Yorktown Heights, NY (US); Prabhakar N. Kudva, Warwick, NY (US); Jude A. Rivers, Cortlandt Manor, NY (US); Pia N. Sanda, Slingerlands, NY (US); John-David Wellman, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 12/243,427

(22) Filed: Oct. 1, 2008

(65) Prior Publication Data
US 2010/0083203 A1  Apr. 1, 2010

(51) Int. Cl.
  G06F 17/50 (2006.01)
  G06F 11/22 (2006.01)
(52) U.S. Cl. .................. 716/100; 716/113; 716/136
(58) Field of Classification Search .................. 716/100, 716/113, 136
See application file for complete search history.

(56) References Cited

U.S. PATENT DOCUMENTS

| | | | |
|---|---|---|---|
| 6,986,078 B2 | 1/2006 | Rodbell et al. | |
| 7,203,881 B1 | 4/2007 | Williams et al. | |
| 7,328,376 B2 | 2/2008 | McGuire et al. | |
| 7,472,051 B2 * | 12/2008 | Mariani et al. | 703/13 |
| 2001/0039642 A1 * | 11/2001 | Anzai | 716/10 |
| 2008/0016477 A1 * | 1/2008 | Kleinosowski et al. | 716/4 |
| 2008/0191769 A1 * | 8/2008 | Uemura et al. | 327/202 |
| 2009/0249301 A1 | 10/2009 | Kalla et al. | |

OTHER PUBLICATIONS

Li et al., "Architecture-Level Soft Error Analysis: Examining the Limits of Common Assumptions", Proceedings of the 37th Annual IEEE/IFIP International Conference on Dependable Systems and Networks (DSN'07), Jun. 2007, pp. 266-275.

Mukherjee et al., "A Systematic Methodology to Compute the Architectural Vulnerability Factors for a High-Performance Microprocessor", Proceedings of the 36th Annual IEEE/ACM International Symposium on Microarchitecture (MICRO), Dec. 2003, pp. 29-40.

Ludden et al., "Functional verification of the POWER4 microprocessor and POWER4 multiprocessor systems", IBM Corporation, IBM J. Res. & Dev., vol. 46, No. 1, Jan. 2002, pp. 53-76.

(Continued)

Primary Examiner — Vuthe Siek
Assistant Examiner — Magid Dimyan
(74) Attorney, Agent, or Firm — Stephen J. Walder, Jr.; William Stock

(57) ABSTRACT

Mechanisms for modeling system level effects of soft errors are provided. Mechanisms are provided for integrating device-level and component-level soft error rate (SER) analysis mechanisms with micro-architecture level performance analysis tools during a concept phase of the IC design to thereby generate a SER analysis tool. A first SER profile for the IC design is generated by applying the SER analysis tool to the IC design. At a later phase of the IC design, detailed information about SER vulnerabilities of logic and storage elements within the IC design are obtained and the first SER profile is refined based on the detailed information about SER vulnerabilities to thereby generate a second SER profile for the IC design. Modifications to the IC design are made at one or more phases of the IC design based on one of the first SER profile or the second SER profile.

20 Claims, 6 Drawing Sheets

OTHER PUBLICATIONS

Kudva et al., "Early Performance Prediction", Proceedings of the Workshop on Complexity-Effective Design: Held in Conjunction with the 32nd International Symposium on Computer Architecture, 2005, www.csl.cornell.edu/albonesi/wced05/wced05.pdf, pp. 1-18.

USPTO U.S. Appl. No. 13/271,827, Image File Wrapper printed Nov. 11, 2011, 1 page.

Bender, C. et al., "Soft-error resilience of the IBM POWERS processor input/output subsystem", IBM J. Res. & Dev., vol. 52, No. 3, May 2008, pp. 285-292.

Kanawati, Nasser A. et al., "Dependability Evaluation using Hybrid Fault/Error Injection", IEEE, 1995, pp. 224-233.

Kellington, Jeffrey W. et al., "IBM POWERS Processor Soft Error Tolerance Analysis Using Proton Irradiation", domino.research/ibm.com/comm/research, IBM Sys & Techgy GP, Austin, TX, 2007, 6 pages.

Kudva, P. et al., "Fault Injection Verification of IBM POWERS Soft Error Resilience", citeseerx.ist.psu.edu/viewdoc/download, 2006, 4 pages.

Li, Xiaodong et al., "Scaling of Architecture Level Soft Error Rate for Superscalar Processors", rsim.cs.illinois,edu/pubs/05selse.pdf, 2005, pp. 1-7.

Li, Xiaodong et al., "SoftArch: An Architecture-Level Tool for Modeling and Analyzing Soft Errors", IEEE, DSN'05 Proceedings of 2005 Intern't Conf On Dependable Sys & Networks, 2005, 10 pages.

Ma, Zhe et al., "System-level analysis of soft error rate and mitigation trade-off explorations", Reliability Physics Symposium (IRPS), 2010 IEEE Interna'l, Jun. 17, 2010, pp. 1-5.

Ramachandran, Pradeep et al., "Statistical Fault Injection", In Proc. Int'l Conf. on Dependable Systems mand Networks (DSN), Jun. 2008, 6 pages.

* cited by examiner

MODELING SYSTEM-LEVEL EFFECTS OF SOFT ERRORS

BACKGROUND OF THE INVENTION

1. Field of the Invention

The present application relates generally to an improved data processing apparatus and method and more specifically to mechanisms for modeling system-level effects of soft errors.

2. Background of the Invention

As technological trends head toward smaller devices and wire dimensions, system design is entering an era of increased chip integration, reduced supply voltages, and higher frequencies. An inescapable consequence of this development is the fact that transient/soft errors will continue to be a serious threat to the general technology of robust computing. Transient errors may occur due to a variety of events, most notable among them being the impact of high energy cosmic particles, alpha particle effects due to the presence of lead in packaging materials, and inductive noise effects (Ldi/dt) on the chip supply voltage resulting from aggressive forms of dynamic power management.

Current soft error rate (SER) projections for Static Random Access Memory (SRAM) cells, latch elements, and logic elements, as technology scales from 65 nm towards 45 nm and beyond, indicate that the SER per bit for SRAM cells appears to be leveling off. However, it must be noted that the bit count per chip is increasing exponentially, per Moore's Law. Latch SER is catching up with SRAM per-bit rates with a steeper slope of increase. Logic SER is projected to increase at a much faster pace, although the absolute numbers are significantly smaller than SRAM or latch numbers at the present time. For Silicon On Insulator (SOI) technology, going forward from 65 nm to 45 nm technology, the latch SER per bit is predicted to increase 2× to 5× fold, and latches per chip are of course expected to increase with integration density. Again, storage cell SER will still dominate and latch errors will also be of increasing relevance at 45 nm technologies and beyond.

BRIEF SUMMARY OF THE INVENTION

In one illustrative embodiment, a method, in a data processing system, is provided for performing soft error rate (SER) de-rating and failures in time (FIT) analysis of an integrated circuit (IC) design. In particular, the method provides mechanisms integrating device-level and component-level soft error rate (SER) analysis mechanisms with micro-architecture level performance analysis tools during a concept phase of the IC design to thereby generate a SER analysis tool. Moreover, the method comprises generating a first SER profile for the IC design by applying the SER analysis tool to the IC design. The method also comprises obtaining, at a later phase of the IC design, detailed information about SER vulnerabilities of logic and storage elements within the IC design. Further, the method comprises refining the first SER profile at the later phase of the IC design based on the detailed information about SER vulnerabilities of the logic and storage elements within the IC design to thereby generate a second SER profile for the IC design. Modifications to the IC design are made at one or more phases of the IC design based on one of the first SER profile or the second SER profile.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
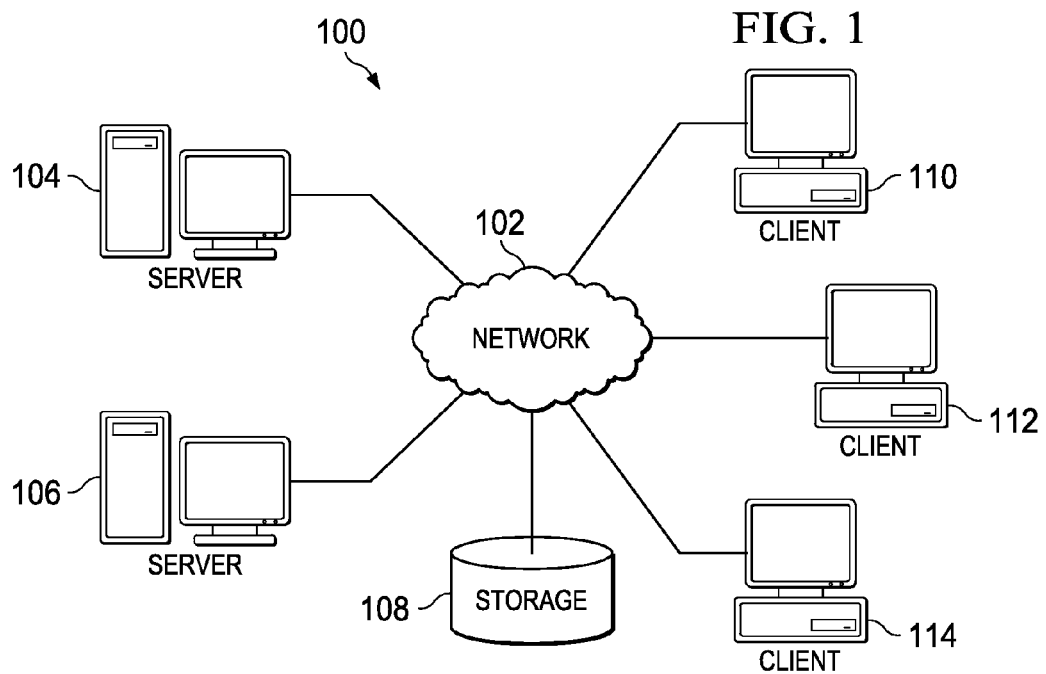
FIG. 1 is an example block diagram of a distributed data processing system in which aspects of the illustrative embodiments may be implemented.

Because of the predicted increase in Soft Error Rates (SERs), it is important to have accurate estimates of failure rates during the design phase of integrated circuit devices. To understand why there is the need for accurate estimates of failure rates during the design phase, consider a hypothetical mid-range (16- or 20-way) high-end server targeted to have a mean-time-to-failure (MTTF) of about 50 years. This translates to a per-processor Failures In Time (FIT) rate of around 125 FITs, based on today's SER data. FIT is a common unit for measuring failure rates where 1 FIT means an average of 1 failure in one billion hours.

To build a future large-scale petaflop supercomputer with, for example, 400,000 microprocessor cores would imply an aggregate processor core MTTF of less than 1 day and a potential full system hardware MTTF of less than 1 hour, taking into consideration all the system nest and fabric. This is clearly unacceptable. Thus, chip-design, according to the illustrative embodiments, begins with a consideration of system-level MTTF targets. Moreover, the design methodology according to the illustrative embodiments is able to estimate or bound the chip-level FITs with reasonable accuracy in order to avoid in-field system quality problems. Furthermore, a balanced combination of circuit/logic-level innovations and architecture/software-level solutions are utilized to achieve the desired FIT target. In particular, the illustrative embodiments provide a comprehensive understanding of the vulnerabilities associated with various units on the chip with regard to workload behavior. With such information being available, appropriate approaches, such as selective duplication, SER-tolerant latch design adoption, and ECC/parity protection of SER "hotspots," may be used for efficient reliability protection. An SER "hotspot" refers to a region of an IC chip that is deemed to be highly vulnerable to bit flips in an element (latch, combinational logic, or SRAM).

The illustrative embodiments provide mechanisms and a methodology for projecting soft error vulnerability of a microprocessor design in a phased-manner across various stages of a design process. In particular, projections made in various phases of one system design may be proactively used to improve and shorten the projections of another system design.

The illustrative embodiments, motivated on the premise that an accurate methodology infrastructure driven by target workloads would enable cost-effective SER solutions during the design process, provides mechanisms for modeling the effects of soft errors on the micro-architectural and architectural functionality of a system. The framework, as described hereafter in the context of illustrative embodiments, is a vehicle for developing fundamental understanding of the system-level effects of soft error rates (SER) as a microprocessor chip design evolves through the various phases of pre-concept, concept, high-level design and register transfer level (RTL) implementation. In one illustrative embodiment, this next generation infrastructure toolset is used to predict device-level, e.g., chip-level, SER failure rates and study reliability-performance tradeoffs during the phased design process.

In one illustrative embodiment, an infrastructure framework is provided for deriving, at one or more stages of an integrated circuit (IC) device design, SER vulnerability maps of the integrated circuit device that may be (optionally) visualized as a color-coded device floorplan that indicates the SER "hotspot" regions of the device. Moreover, for the one or more stages of the IC device design the design may be iteratively improved as the IC device design goes through the one or more stages of the design, successively enhancing the protection-level of the most vulnerable units. Furthermore, at the one or more stages of the IC device design, the near-optimal balance between on-device hardware recovery support and system (software) level soft error handling may be derived in order to meet system SER MTTF targets with minimal performance overhead.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
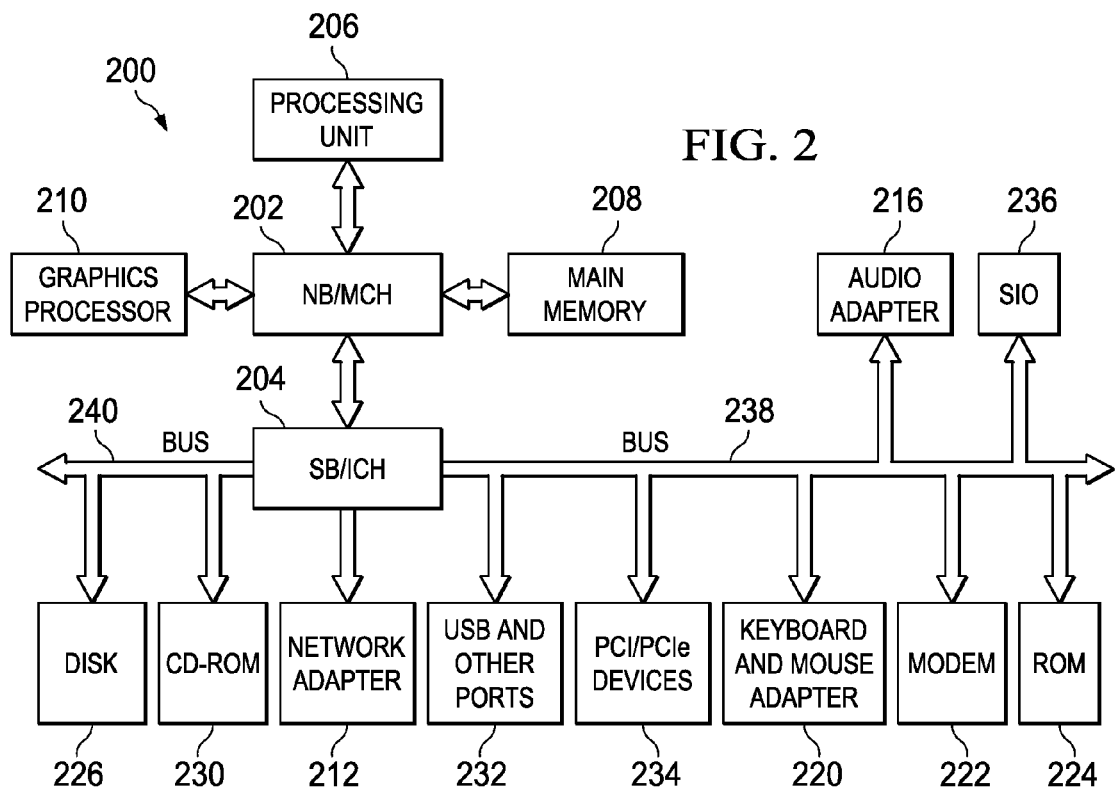
FIG. 2 is an example diagram of a computing system in which aspects of the illustrative embodiments may be implemented.

The illustrative embodiments provide mechanisms for modeling system-level effects of soft errors and thus, may be used with distributed data processing systems, stand alone data processing system, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring to FIG. 1 again, users of the various client computing devices 110-114 may collaborate on the design of an integrated circuit device using one or more tools provided by a server 104 or 106, for example. Moreover, the server 104 or 106 may provide a tool for modeling the system level effects of soft errors in accordance with one illustrative embodiment. Alternatively, the various tools provided by the server 104 or 106 may be provided within a stand-alone data processing system.

The tool for modeling system level effects of soft errors, in accordance with one illustrative embodiment, integrates device-level and component-level soft error rate (SER) analysis with micro-architecture level performance analysis tools during the early phase of integrated circuit device design, e.g., the concept phase of the design. For purposes of the description of the illustrative embodiments, it will be assumed that the integrated circuit device being designed is an integrated circuit (IC) chip. The integration of device-level and component-level SER analysis with microarchitecture-level performance analysis tools at the concept phase allows designers to study key performance-power-reliability trade-offs. In particular, besides the modeling tool of the illustrative embodiments projecting SER de-rating factors and corresponding SER FIT values for the IC chip and its various components, the modeling tool framework also allows the designers to undertake "what-if" evaluations and comparisons, with a focus on adopting various latches and cells from a design library in the various units based on their respective SER vulnerability characteristics. The modeling tool framework further allows an architecture definition team to decide on the exact style and level of micro-architectural redundancy that may be needed to achieve per-chip SER FIT targets.

In later stages of the design, as the design reaches the register transfer level (RTL) mode, the IC chip SER profile is refined, as more accurate information about the unit-wise latch distributions, latch types, and SER vulnerabilities of logic and latch elements become available. Though in these later design phases major micro-architecture paradigm changes are generally not possible, the analysis derived from the modeling tool framework of the illustrative embodiments aids in adjusting the relative protection levels and latch-types across highlighted units of the IC chip design.

Figure 3:
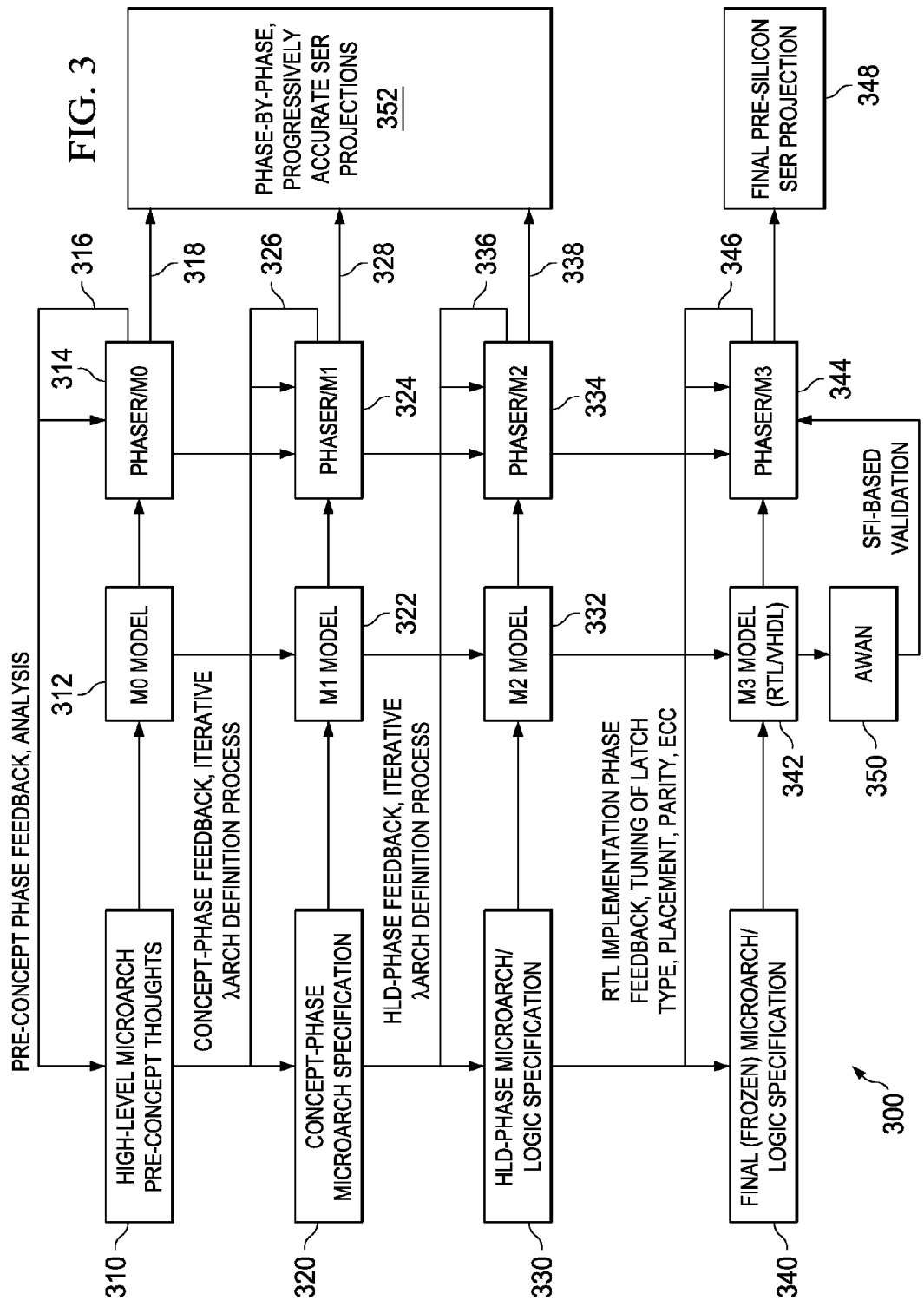
FIG. 3 is a diagram illustrating a detailed framework of a phased SER prediction modeling framework in accordance with one illustrative embodiment.

FIG. 3 presents a detailed overview of a framework 300 of one illustrative embodiment of the phased multi-stage prediction modeling, evaluation, and estimation framework of soft error vulnerability through the various stages of system design. The main methodology behind each of the phases 310, 320, 330, and 340 in the framework 300 are similar with the additional impetus that as the design moves from the pre-concept phase 310 to the next higher phases 320, 330, and 340, respectively, the information available and its accuracy improves, making it possible for the modeling accuracy to keep improving. In particular, the projections and predictions made in the previous phase can be used in a loop-back manner to improve the next phase projections and predictions, and vice versa.

As illustrated in the framework 300 in FIG. 3, there are four basic models of the integrated circuit device under design, e.g., an IC chip for purposes of this description, around which the soft error rate (SER) modeling is focused at the various design phases. These particular models are: (a) the M0 model 312 at the pre-concept phase 310; (b) the M1 model 322 at the concept phase 320; (c) the M2 model 332 during the high-level design (HLD) phase 330; and (d) the M3 model 342 during the register transfer level (RTL) implementation phase 340. These four models, M0, M1, M2, and M3 have corresponding IC chip SER workload modeling engines: Phaser/M0 314, Phaser/M1 324, Phaser/M2 334, and Phaser/M3 344, where the latch/cell types and counts, with their corresponding vulnerabilities, are combined together with the active workload residencies of the chip or component to produce respective increasingly accurate SER projections 318, 328, 338, 348, and 352. At each of the Phaser/Mi components, with i=0, 1, 2, 3, a lateral iteration 316, 326, 336, and 346 of improving the raw SER modeling and workload residency aids the accuracy of the SER projection at that stage.

Workload residency is a measure of the opportune proportion of cycles during a workload execution for which bit-flip events could alter the program correctness. In effect, workload residency is a measure of a logic element's (average) susceptibility to soft errors; measuring the cycles during which the logic element is working on correct-path instruction execution which could affect the correctness of the workload output versus the total number of cycles of execution. The residency can be measured for logic elements, storage elements, etc. and may be measured at various levels of granularity from single transistors through larger accumulations (e.g. logical units, etc.). Residency is similar to the familiar metric of utilization, but with the additional restriction that only the utilized cycles in which the data stored or logic being computed could result in alterations of the final workload output (i.e. a soft error) are considered.

The M0 model 312 is an analytical performance model, e.g., a spreadsheet or the like, or a very early "cycle-approximate" simulator that is adapted from an earlier generation cycle-accurate M1 performance model 322. As the design definition progresses to the concept phase 320, the architecture team arrives at a more definite view of the processor core and chip-level micro-architecture. At this stage, the framework 300 leverages the M1 (cycle-accurate performance) model 322 for the core to build the SER analysis tool. Later, during the HDL phase 330, the M1 performance model 322 is replaced by a "latch-accurate" M2 model 332, where the inter-unit interfaces are accurately modeled in terms of the exact latch counts. The intra-unit execution semantics are still written in a behavioral format, e.g., using C/C++ type languages, as in the M1 model 322, for example. During the HDL phase 330 of the design, the corresponding chip SER workload modeling paradigm, Phaser/M2 334, is able to model the inter-unit error propagation effects more accurately since those interface latches and their switching activities are directly observable during the simulation of specific workloads.

During the RTL implementation phase 340, the framework SER analysis moves over to link up with the RTL (M3) model 342 which contains detailed logic, latch, and timing information for the full processor. In addition to VHDL cycle-accurate software simulation (which is rather slow), the framework 300 has the facility for using significantly accelerated AWAN hardware simulation 350 of the RTL model 342, which allows for running full benchmarks if necessary, at the RTL detail level. AWAN hardware simulation 350 is described in Ludden et al. "Functional Verification of the POWER4 Microprocessor and POWER4 Multiprocessor Systems," IBM Journal of Research & Development, Vol. 46, No. 1, pages 53-76, 2002, which is hereby incorporated by reference. At the RTL implementation phase 340 of the design, as the RTL approaches full functionality, the framework 300 can also leverage validation/calibration support from statistical fault injection (SFI) approaches.

The details of the Phaser/Mi components of the framework 300, where i=0, 1, 2, 3, will now be described. Since the various phases of the framework 300 are not fundamentally different when considered from a high level, the methodology of the framework 300 will be illustrated through an in-depth generalized discussion of Phaser/M1. It is assumed that the design has a cycle-accurate M1 microarchitecture simulator and preliminary design VHDL code available, with clear knowledge and choices of the various technology elements, e.g., latches, combinational logic, and memory cells, along with the technology parameters that govern their behavior.

As Li et al. has shown in "Architecture-Level Soft Error Analysis: Examining the Limits of Common Assumptions," Proceedings of the 37$^{th}$ Annual IEEE/IFIP International Conference on Dependable Systems and Networks, Edinburgh, U.K., 2007, pages 266-275, which is hereby incorporated by reference, for practical ranges of the native per-bit SERs observable at sea level, and for modeled systems with tens of components (units), a simpler, post-processing approach that uses an instrumented simulator to collect average workload residency statistics per workload run, can yield sufficiently accurate per-unit and total system SER. Such an approach is based on two steps. In a first step, a per-unit average architectural vulnerability factor (AVF), as described in Mukherjee et al., "A Systematic Methodology to Compute the Architectural Vulnerability Factors for a High-Performance Microprocessor," Proceedings of the 36$^{th}$ Annual IEEE/ACM International Symposium on Microarchitecture," San Diego, Calif., 2003, pages 29-40, which is hereby incorporated by reference, is estimated. The AVF is then multiplied by the unit maximum (unmasked or raw) SER to project the real, i.e. derated, SER of the unit as actually manifested in program behavior. In a second step, unit-level error rates are added to derive the chip-level SER value, which is referred to generally as the sum of failure rates (SOFRs). However, it is important to stress that the accuracy of the unit-wise and total manifested failure rates depends on how the AVFs are collected.

In the Phaser/Mi components of the illustrative embodiments, a post-processing approach is used to collect all the required average residency statistics at the end of a workload run. Those statistics are then combined with the detailed information of per-unit latch distributions of specific types and protection levels, along with native technological data related to raw per-bit SER values. Thus, the illustrative embodiments use new data (workload residency, etc.) and metrics (raw FITS, etc.) to obtain a new measure of the IC design (i.e. susceptibility to SER) than has been previously known in post processing mechanisms. The AVF/SOFR approach estimates the SER of an IC chip or system in two steps. The first step, i.e. the AVF step, estimates the SER of the individual components under the basic assumption that the probability of failure is uniform across a program execution. Hence, the SER of a given component in a processor chip is simply the fraction of time it holds useful work and/or data multiplied by the raw SER of the component. This fraction of time is referred to as the component value of data residency. The second step, i.e. the SOFR step, estimates the SER of the entire IC chip or system by adding together the individual SER values of the constituent components under the general assumption that the inter-arrival time for failures is exponentially distributed.

Depending on the particular design phase, the methodology derives the residency factors from the corresponding simulation model, e.g., M0 312, M1 322, M2 332, or M3 342 in FIG. 3. In one illustrative embodiment, the framework 300 uses a detailed method to calculate the architectural residency factors that can be implemented more practically than known methodologies while preserving accuracy. For example, a systematic method to monitor only useful register file residencies, i.e., those that contribute to actual instruction completion and modification of the architected register and memory state, is utilized. The term "architected" refers to the components of the machine that are accessible by software including memory, register files, special-purpose registers, and the like. The measured residency data is combined with the various latch, logic, and cell raw SERs of the targeted IC chip in a systematic manner to project the de-rating factors as well as the overall SER.

Figure 4:
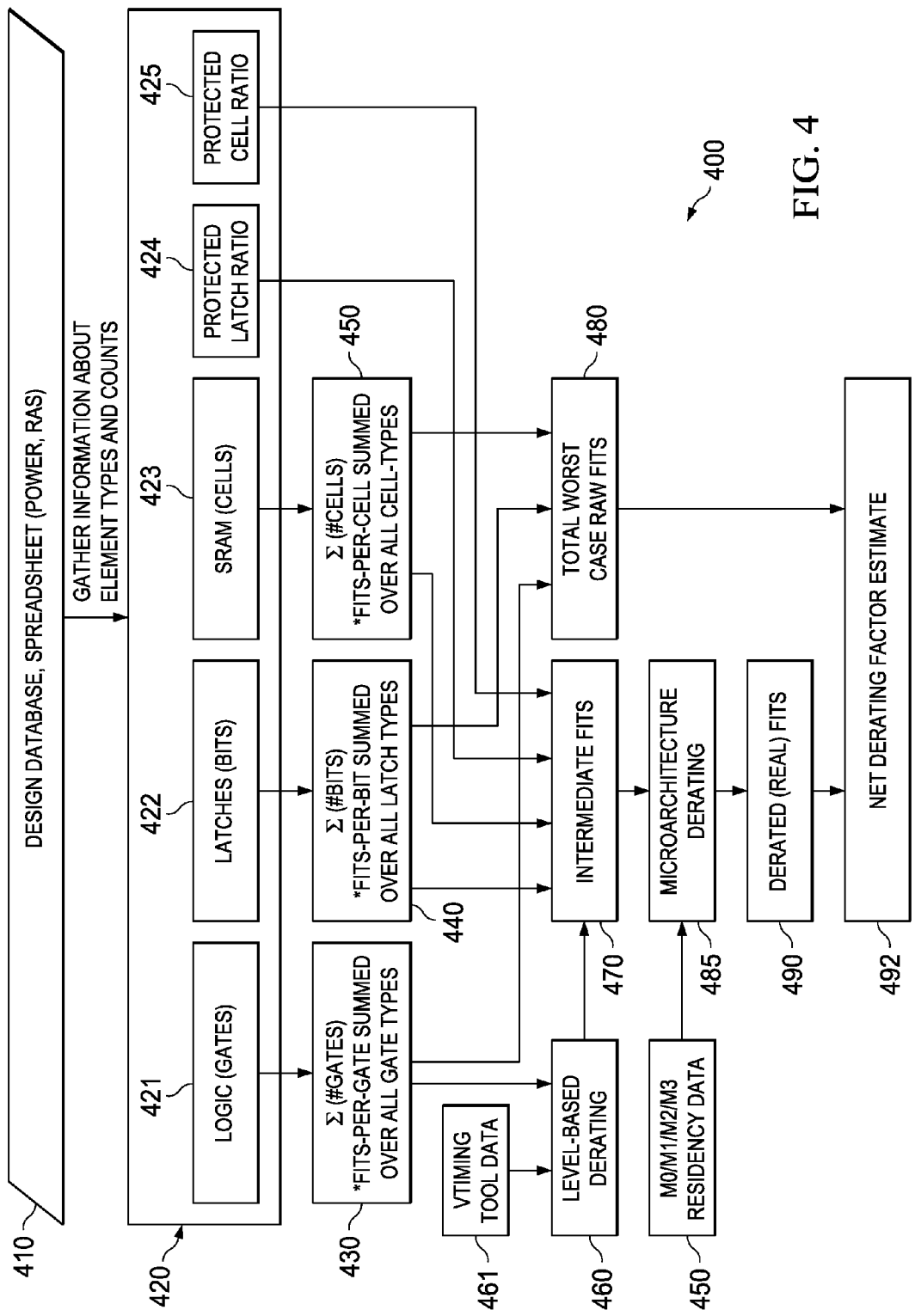
FIG. 4 is a flowchart representation of the process of estimating the failure in time and rating of a chip in accordance with one illustrative embodiment.

Referring now to FIG. 4, a flowchart representation of a process of estimating the failure in time and rating of a chip in accordance with one illustrative embodiment is depicted. The process outlined in FIG. 4 may be performed, for example, by the Phaser/Mi in FIG. 3, for example. A quick inspection of the process 400 demonstrates that a considerable amount of data and a number of factors from various sources are factored and merged together to achieve a realistic SER and de-rating prediction model. Generally, the framework 300 revolves around two major approaches: (1) estimating the raw SER of the targeted IC chip or system; and (2) deriving the average residency of the typical workload executing on the same IC chip or system. These two derivations are used to accurately predict the de-rating factor and the projected SER of the IC chip or system under study.

The raw SER of an IC chip is defined as the expected total SER assuming that the chip is busy 100% of the time and that every bit or cell upset that occurs during its operation leads to a manifested soft error. Accurate raw SER modeling of an IC chip or its components utilizes an in-depth knowledge of the constituent latches, array cells, and combinational logic with respect to counts and types as well as their associated vulnerabilities to soft errors. As illustrated by the process 400 in FIG. 4, the framework 300 of the illustrative embodiments gathers this element and technology information 420 of the logic 421, latch 422, and SRAM 423 counts, as well as type data, from a design database 410, which may be maintained, for example, in a storage device associated with the data processing system, e.g., storage 108 in FIG. 1, hard disk 226 in FIG. 2, or the like. In addition, information on the ratio of latches 424 and memory cells 425 protected against errors, capable of recovering from errors, as well as those that will only signal the occurrence of errors, are also taken from the design database 410. Since the framework 300 is multi-phase, it is expected that this data is updated frequently as more accurate design data becomes available with the maturity of the design.

The Phaser/Mi component modeling computes the contribution of SER by each of the elements, e.g., logic, latches, SRAM, and the like. As shown in the process 400 in FIG. 4, the raw SER contribution of combinational logic 430 is basically the summation of all gates multiplied by the respective gate's native raw FIT. Essentially, the raw SER/FIT values are simple measures of the susceptibility of the basic circuit/device structures, given the technological parameters of the device (i.e. sizes of gate, oxide thickness, voltage level, doping, etc.) to be affected by various quanta of "noise" (i.e. energy that is not specifically intended data value). In the development of a digital circuit in a specific technology (i.e. 45 nm CMOS process) there is a technology team that defines a set of basic elements (the device library, which includes bit latches, basic gates, mux elements, etc.) that are used to implement the desired design. This design library team also runs various experiments, including electrical simulations, etc. to determine the raw susceptibility of the devices to these noise effects (of which an external strike by a galactic particle, e.g., an alpha particle, etc. is one possible source). Devices that are run closer to the threshold voltage, or with narrower gate channels, etc. are more susceptible, and the designers have the option to choose among a variety of different devices with different SER/FIT characteristics (among others, e.g., speed, power, etc.).

With regard to the mechanisms of the illustrative embodiments, the generation of raw SER/FIT information is a precursor to the operation of the mechanisms of the illustrative embodiments. This information is generally kept in the form of design database (i.e. as attributes in the design library, or externally in a database, etc.) and may or may not change occasionally as the technology becomes better characterized, or as new experiments on the basic circuit data provide better information about the raw FIT of devices. This data is available from each technology foundry/fabrication facility, for each design library supported. The illustrative embodiments take in this raw SER/FIT information and operate upon it in the manner described herein.

The raw SER contribution of latches 440 is the summation of all latch bits multiplied by the respective latch bit's native raw FIT. The raw SER contribution of SRAM or storage structures 450 is the summation of all memory/storage cells multiplied by the respective cell's native raw FIT. The summation of these values 430, 440, and 450 give the total worst case Raw FITs 480 of the IC chip or system under study.

However, it should be noted that without even taking a workload running on the IC chip or system into account, there are still elements which do not, or cannot, contribute to the raw SER of the IC chip. The basic reasoning is that some of the elements 420 in the IC chip are protected against soft errors, such as through error correcting codes (ECC) or parity checking, and can either recover from an occurrence of a soft error or be able to signal such occurrence for the necessary mitigating processes to proceed. In addition, there is empirical established knowledge that due to logic-level masking effects in a combinational logic chain or cone, soft error upset events on gates in levels 4 and beyond generally do not contribute to manifested errors in the receiving latch bank in real microprocessor pipelined logic paths. Hence, the total worst case Raw FITs discussed above can be further de-rated or masked based on the recognition of elements within the elements 420 that do not, or cannot, contribute to the raw SER of the IC chip or system.

The term "de-rating" or "de-rate" refers to the portion of time an IC chip unit or structure (whether logic or storage) is not in use, or during which it is operating but in a manner that cannot affect an executing workload's correctness. Therefore, it can be said that the structure or unit is not susceptible to soft errors during that time period. This is termed de-rating because it reduces the overall opportunity for soft error vulnerability in a unit or structure from a baseline or raw SER value (derived from the underlying unit/structure hardware primitives, which does not take the specific implementation usage into account). For example, a microprocessor unit with a de-rating factor of 75% over a given workload execution implies that such a unit is susceptible to errors only 25% of the total execution time of the workload run, which factor is used to reduce the baseline per-cycle susceptibility by that proportion. De-rating factors result from a wide set of behaviors, from low-level electrical factors (e.g., the latch duty cycle) through high-level effects (e.g., the instruction set architecture and programming conventions). Overall, de-rating refers to any of the factors that reduce the raw SER from the base value.

To further de-rate or mask the total worst case Raw FITs, the design planned protected latch ratio 424 and protected cell ratio 425 data, gathered from the design database 410, as well as information on the gate levels in the various logic chains, are used. In particular, the combinational logic chain SER 430 is de-rated further by knowing the actual levels and composition counts of logic gates and being able to extract the proportion of the zero to three gate type levels and counts that matter, as discussed above. For the levels and counts of the combinational logic gates within the logic chains, such data is gathered by applying a VHDL dissecting tool, e.g., a Vtiming tool 461, on the evolving register transfer level (RTL) model of the IC chip or system. An example of a Vtiming tool 461 that may be utilized with the mechanisms of the illustrative embodiments is described in Kudva et al., "Early Performance Prediction," Proceedings of the Workshop on Complexity—Effective Design: Held in Conjunction with the 32nd International Symposium on Computer Architecture, Madison, Wis., 2005 (see www.csl.cornell.edu/albonesi/wced05/wced05.pdf), which is hereby incorporated by reference.

The Vtiming tool 461 scans the VHDL description of the IC chip or component and gathers statistics about the number and types of logic gates within each level of a given combinational logic chain. The Vtiming tool 461 is able to provide an estimate of the length and number of gates in various levels of logic of a cone of logic in the early stage RTL description without the requirement of a gate level design or synthesis. Based on the number of signals that are in the input set of an output or state signal, an estimate of the number and sensitivity of combinational logic in the design can be made by the Vtiming tool 461. Using this information, the raw FITs contributed by the combinational logic 430 are further de-rated or masked 460 by considering only the gates in the level zero to level three of the design. The de-rated combinational logic raw FITs 460 are then combined with the latch and SRAM raw FITs 440 and 450, both de-rated by the protected latch ratio 424 and protected cell ratio 450, respectively. The resulting intermediate FITs 470 is considered purely micro-architecture dependent, before the effects of workload behavior are considered.

This far the raw SER of an IC chip or system are modeled assuming that all bit flips are of consequence. However, it is known that for the typical micro-architecture or IC chip/system, the workload residency 550 of useful data is well less than 100% across all modeled units within the IC chip or system. Hence, to better estimate the de-rating factor or project the manifested FIT, statistics on the residency 550 of relevant live data values within the IC chip or system are gathered. Such residency values are collected as accurately as possible on the IC chip or system under study through its available simulator as it executes a typical representative workload.

Figure 5:
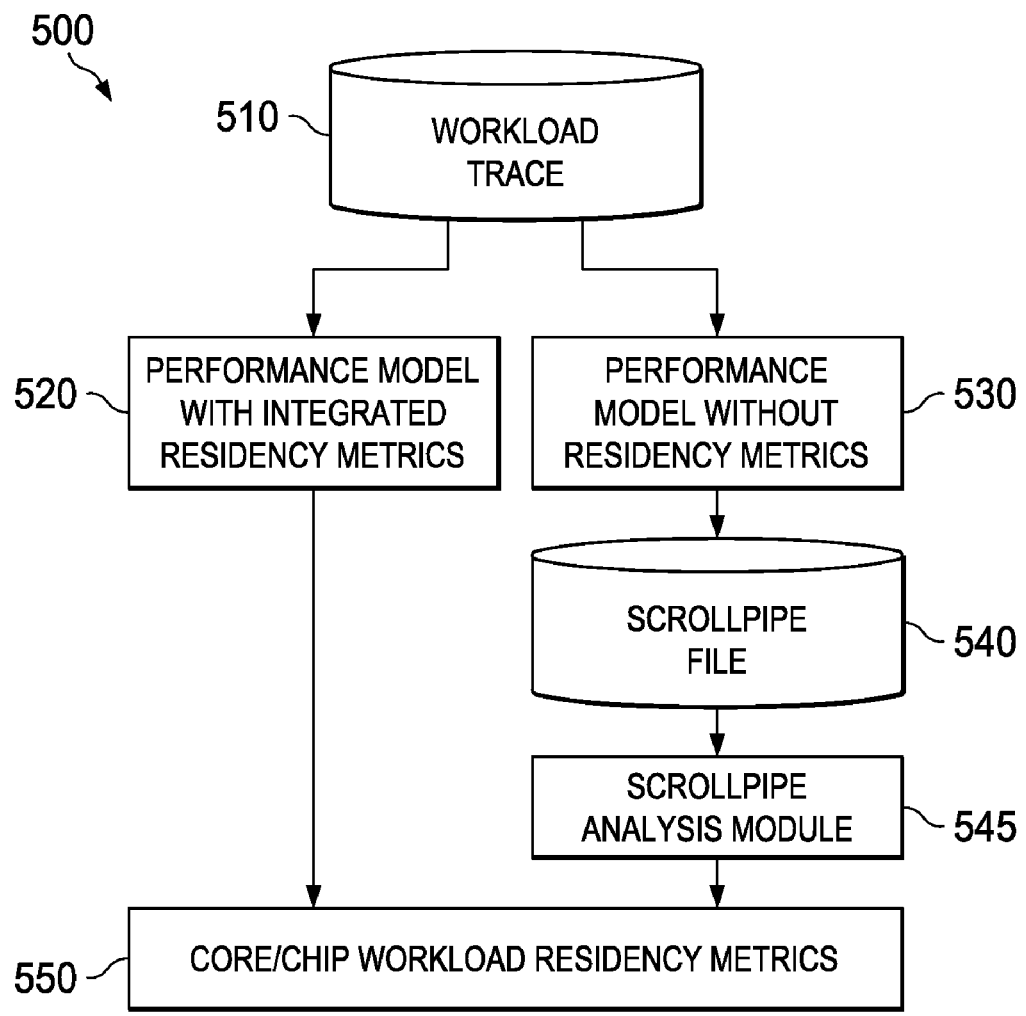
FIG. 5 is a flowchart representation illustrating two approaches for estimating the micro-architectural workload residency of a chip in accordance with one illustrative embodiment.
Figure 6:
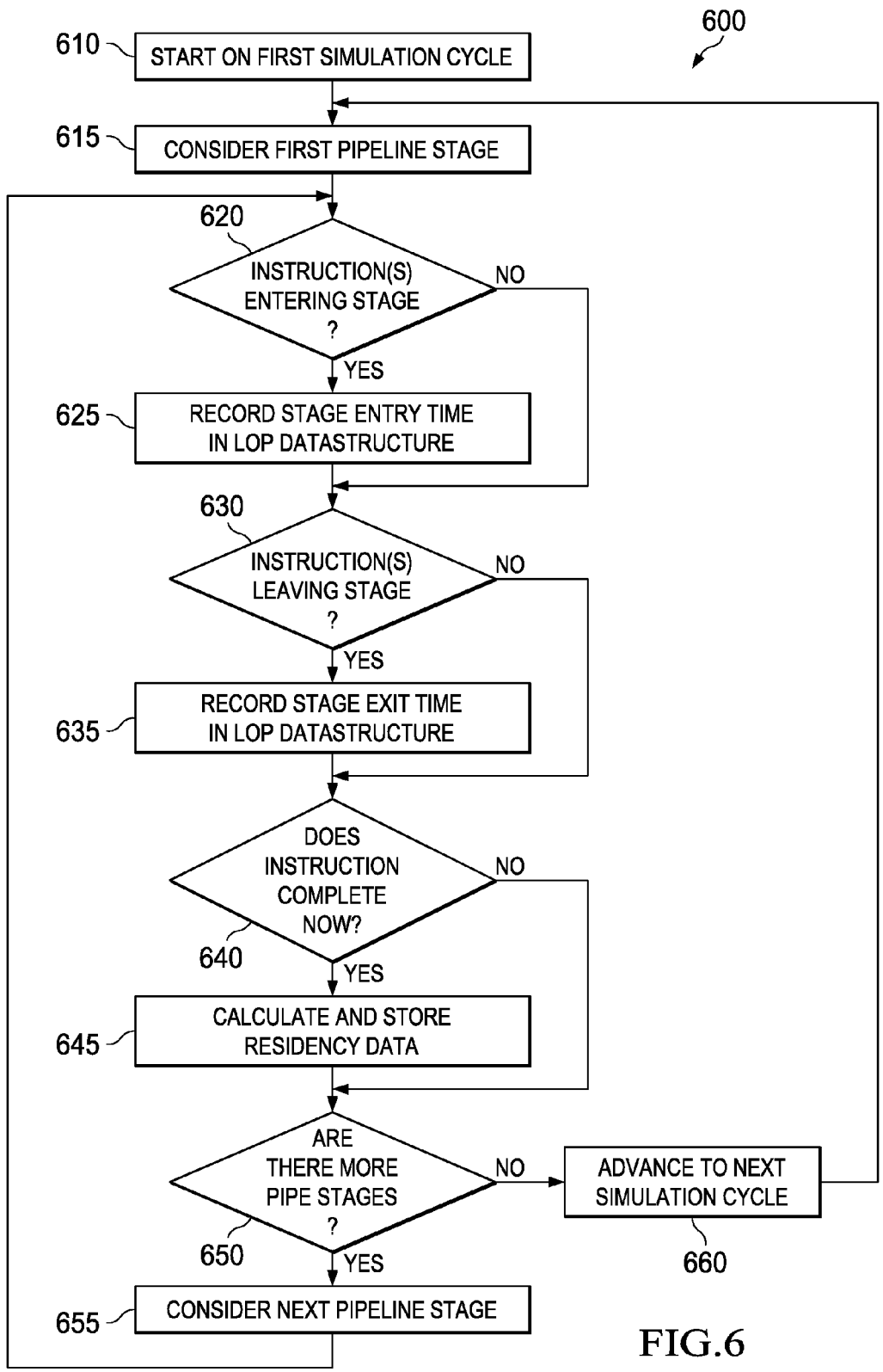
FIG. 6 is a flowchart representation illustrating an in-depth micro-architectural residency gathering of a chip through a simulator in accordance with one illustrative embodiment.

The residency data or metrics collection process is illustrated in FIGS. 5 and 6. With the workload residency data or metrics available 550, the intermediate FITs 470 value is micro-architecturally de-rated 485 to the real (or manifested) FITs 490. A comparison between the de-rated (real) FITs 490 and the total worst case Raw FITs 480 generates the net de-rating factor estimate 492. It should be noted that the methodology as described has been with a focus on silent data corruption (SDC)-related SER manifested at the program output. The description here has focused on predicting an early stage (necessarily conservative) bound on the SDC-specific SER, or equivalently the machine, de-rating factor applicable to SDC-specific error rate estimations. However, those skilled in the art would realize that the methodology allows for breaking the micro-architectural de-rating under study into various groups of de-rating: de-rating due to corrected error class, de-rating due to checkstop error class, de-rating due to micro-architecturally vanished error class, de-rating due to incorrect architected state error class, and the like.

With reference now to FIG. 5, a flowchart representation illustrating two approaches for estimating the micro-architectural workload residency of a chip in accordance with one illustrative embodiment is depicted. The operations outlined in FIG. 5 may be implemented, for example, in the Mi models, where i=0, 1, 2, 3, e.g., models 312, 322, 332, and 342 in FIG. 3, which a particular emphasis on 322 for purposes of this description.

Structures in a microprocessor IC chip can be broadly classified into two major groups: logic and storage. Logic structures can be defined to be the various data and control processing units on the IC chip that are made up of combinational logic gates and latches. Typical examples of on-chip logic structures then include the fixed-point unit (FXU) pipelined logic datapath (with its associated control logic) and the instruction decode unit (IDU) logic. Storage is defined to be the various structures that hold data values, such as the queues, register files, and other SRAM macros, for example. Of course, latches may also serve as staging and data-hold resources, especially during stalls in a pipeline flow. In this case, depending on how such stalls are implemented in relation to the clock-gating functionality within the pipeline, certain latch banks may also be categorized within the storage class. However, the residency modeling for such pipeline latches is simpler than register files and arrays and is better treated under the logic category.

Workload residency modeling 500, as depicted in FIG. 5, attempts to measure the opportune proportion of cycles during a workload execution for which bit-flip events could alter program correctness. Hence, to accurately capture such residency data, the focus includes only the true path of program execution. For example, dataflow-centric soft errors on a wrongly speculated path during program execution cannot alter program output. Similarly, rejected or flushed executions, dead instructions, NOPs (no operations), and performance-enhancing instructions (e.g., those related to data pre-fetch) do not contribute to SER-induced data corruption. In effect, for logic structures, the question that is asked is, during what fraction of the cycles is there an operation that uses a particular logic structure in such a manner as to lead to actual completed instructions? For storage structures, the question is, during what fraction of cycles is the storage resource holding a value that will subsequently be used in the true execution path?

When it comes to SER modeling, there are often attempts to use microarchitecture utilization as a proxy for actual residency. However, a close examination of utilization and residency in a complex microprocessor pipeline shows a potentially significant difference between the two. When utilization is used, there are often corrective factors that may be applied (e.g., use of average stall event or dead instruction statistics) to approach a better residency average. However, in general, there are many more sources of de-rating imposed by the micro-architecture-workload pair. The effective correction factors to the computed utilization data in proxy for residency (due to all sources) may be awkward and error-prone to derive individually via average statistical behavior alone. Hence, with the framework 300 of the illustrative embodiments, the micro-architecture simulator is accurately instrumented for gathering actual residency data as shown in FIG. 5.

As the process 500 in FIG. 5 portrays, there are two main ways whereby overall residency data can be gathered using the micro-architecture or IC chip simulator. One approach is to directly instrument 520 the IC chip or micro-architecture simulator (often written for performance data gathering) with the residency metrics data gathering instructions. In that case, when the simulator is fed with a workload trace 510, the necessary residency data 550 is gathered. Another approach for gathering residency data, such as when the source performance simulator is not available for instrumentation 530, is to resort to capturing a scroll pipe output 540 of a performance run and using an analysis module 545 to gather the residency data from such an output. A scroll pipe output is a representation of the timing state of instructions or internal operations moving through the microprocessor pipeline. It is, effectively, a visualization medium that (usually graphically) represents on a cycle-by-cycle basis the possible locations in a pipeline of various internal data (i.e. instructions, cache access data, control signals) and, for each such location in use, what instruction, datum, etc. is using that location on each cycle. Given the capability to visualize the utilization of the pipeline, one can then try to estimate the residency using various means.

With reference now to FIG. 6, a flowchart representation illustrating an in-depth micro-architectural residency gathering of an IC chip through a simulator in accordance with one illustrative embodiment is depicted. The operation outlined in FIG. 6 may be an in-depth illustration of the operations performed as part of elements 520 or 545 in FIG. 5, which again may be performed by the Mi models. The process 600 in FIG. 6 illustrates an example of the detailed residency gathering operations within a performance simulator or a scroll pipe analyzer. Basically, each instruction records significant event times during simulated execution, and these per-instruction metrics are gathered when an instruction completes. Starting at the first cycle of simulation 610, and for each subsequent cycle of the simulation, the analysis tool starts at the first pipeline stage 615 and considers each pipeline stage in turn 655. For each pipeline stage, a determination is made as to whether an instruction is first entering that pipeline stage 620. If there is an instruction entering that stage, the time of the instruction's entry into the stage (i.e., the current cycle of simulation) is recorded in the instruction's internal data structure (e.g., a lop data structure) 625. A determination is then made as to whether an instruction is leaving the pipeline stage 630. If so, then the time of the instruction's exit from the stage (i.e., the current cycle of simulation) is recorded in the instruction's internal data structure (e.g., a lop data structure) 635.

A determination is made as to whether an instruction completes on this cycle 640. If so, then the residency data contributed by this instruction is calculated and recorded in the global residency tracking data-structures of the analysis tool 645. If there are more pipeline stages 650, then the analysis continues with the next pipeline stage 655, otherwise the analysis moves on to the next cycle of the simulation 660 wherein the scan of pipeline stages is begun anew for that cycle of simulation. In this way, the contribution of each instruction throughout the simulation can be recorded with the instruction, and is promoted to the global residency statistics only when the instruction completes (and therefore proves to have been from a final execution pass on the correct execution path).

As can be seen from the foregoing, illustrative embodiments present a phased methodology framework that allows progressive refinement of soft-error related de-rating and failure in time analysis as the design progresses from (pre)concept phase to high-level design phase and the RTL implementation phase. By the nature of the illustrative embodiments, the methodology renders itself to a pipelined evaluative framework that allows quicker start of SER analysis for a next generation microprocessor IC chip design starting off from the present phase of a current design, enabling higher design/evaluation throughput in a multi-chip design process.

The illustrative embodiments provide a quicker start of SER analysis because a higher-level analysis on an earlier-availability model is performed. SER analysis have historically been done using VHDL and/or RTL models which are often only available very late in the design process or cycle, or perhaps even only after initial fabrication of actual IC hardware. In contrast, approach of the illustrative embodiments enables SER modeling using the early design models, and even the earliest design-space exploration models, which are available very early in the design process. Thus, the illustrative embodiments enable the capability to consider SER effects from the very earliest stages of the design of a new microprocessor core or system.

Once the SER analysis is performed, the results of this analysis, i.e. the SER modeling, may be used in many different ways. For example, the results of the SER analysis may be used to determine more robust system options (i.e. affecting the actual design selected, by providing a way to compare SER vulnerability across designs) through identification of high-vulnerability structures. Moreover, the results of the SER analysis may be used to perform trade-off analysis in the addition of SER vulnerability mitigation mechanisms. For example, the results of the SER analysis may indicate the need to use of parity bit and error correcting code (ECC) checkers as well as the use of radiation-hardened latches in various parts of the IC chip.

Figure 7:
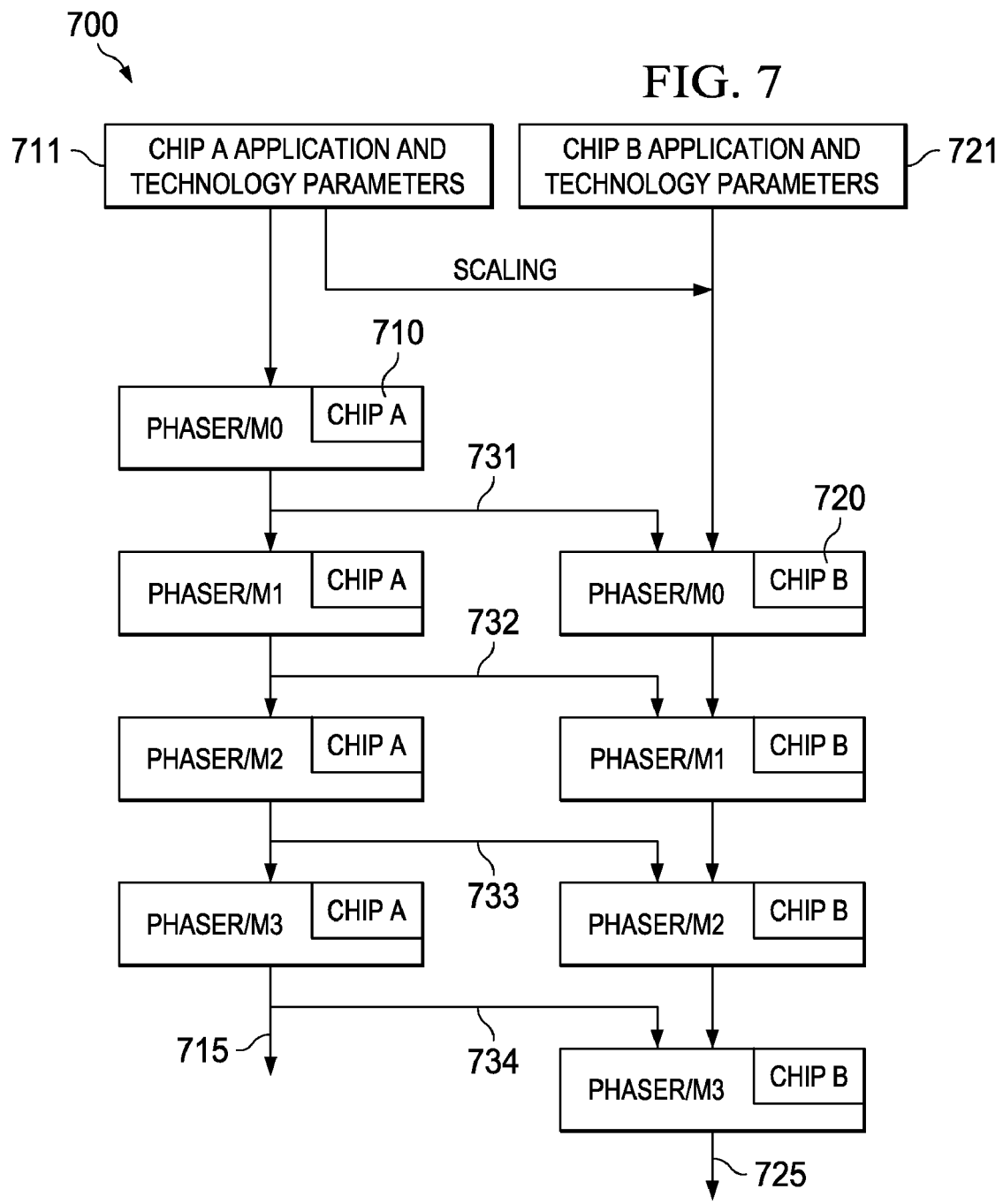
FIG. 7 is a diagram illustrating a pipelined evaluation facility and the synergies thereof of applying the phased methodology to two back-to-back chip designs in accordance with one illustrative embodiment.

As illustrated in FIG. 7, two IC chip design projects 710 and 720 may be run in-step in a pipelined fashion where chip A 710 is always a phase ahead of chip B 720. In this step design fashion, the SER analysis for chip A 710 at the pre-concept phase starts off with the necessary application and technology parameters 711. As chip A exits the pre-concept phase, its pre-concept phase analysis output 732 and its scaled application and technology parameter data 711 are combined with chip B's tentative application and technology parameter data 721 to start off chip B's pre-concept phase SER analysis. The information from chip A 710 can help in making the analysis for chip B 720 both more accurate and quicker. In that same step fashion, Chip A's concept phase output 732 is combined with chip B's pre-concept phase analysis output in feeding chip B's concept phase analysis. The same process continues in feeding chip A's next two phases outputs 733 and 734 with chip B's previous outputs in effecting chip B's next phases' SER analysis outputs. The process continues this way until chip A's final SER analysis output 715 is derived and then a phase later, chip B's final SER analysis output 725 is derived.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. A method, in a data processing system, of performing soft error rate (SER) de-rating and failures in time (FIT) analysis of an integrated circuit (IC) design, comprising:
   integrating, by the data processing system, device-level and component-level soft error rate (SER) analysis mechanisms with micro-architecture level performance analysis tools during a concept phase of the IC design to thereby generate a SER analysis tool;
   generating, by the data processing system, a first SER profile for the IC design by applying the SER analysis tool to the IC design;
   obtaining, by the data processing system, at a later phase of the IC design, detailed information about SER vulnerabilities of logic and storage elements within the IC design; and
   refining, by the data processing system, the first SER profile at the later phase of the IC design based on the detailed information about SER vulnerabilities of the logic and storage elements within the IC design to thereby generate a second SER profile for the IC design, wherein modifications to the IC design are made at one or more phases of the IC design based on one of the first SER profile or the second SER profile, wherein generating the first SER profile comprises:
   creating a first analytical performance model of the IC design, wherein the first analytical performance model of the IC design is created at the concept phase of development of the IC design; and
   generating first SER projections and first FIT predictions for the IC design using the first analytical performance model of the IC design, wherein the first SER projections and first FIT predictions are generated by a SER workload modeling engine of the SER analysis tool, and wherein the SER workload modeling engine collects SER values for each of a plurality of components of the IC design based on average data residency statistics for the components of the IC design, and combines the SER values to generate a raw SER value for the IC design.

2. The method of claim 1, wherein refining the first SER profile to generate a second SER profile for the IC design comprises:
   creating a second analytical performance model of the IC design, wherein the second analytical performance model of the IC design is created at a second phase of development of the IC design that is later in time than the concept phase of development of the IC design; and
   generating second SER projections and second FIT predictions for the IC design using the second analytical performance model of the IC design based on the first SER projections and first FIT predictions for the IC design.

3. The method of claim 1, wherein collecting SER values for each of the plurality of components comprises:
   collecting raw SER contributions from combinational logic, latches, and storage structures, if any, for each of the components in the plurality of components to generate a total worst case raw FIT value for the IC design; and
   de-rating the total worst case raw FIT value for the IC design based on an identification of elements within the components that do not or cannot contribute to the raw SER value of the IC design.

4. The method of claim 3, wherein de-rating the total worst case raw FIT value for the IC design comprises de-rating the total worst case raw FIT value based on a planned protected latch ratio and a protected cell ratio of the IC design.

5. The method of claim 1, wherein the SER workload modeling engine determines average data residency statistics by one of instrumenting an IC micro-architecture simulator with residency data gathering instructions or capturing a scroll pipe output of a performance run of the IC micro-architecture simulator and gathering residency data from the scroll pipe output.

6. The method of claim 1, wherein the modifications to the IC design comprises at least one of determining more robust options for the IC design through identification of high-vulnerability structures in the IC design or performing a trade-off analysis for modifying the IC design.

7. The method of claim 1, wherein the first SER projections and first FIT predictions are used in a loop-back manner to improve the second SER projections and second FIT predictions.

8. The method of claim 1, further comprising:
   generating third SER projections and third FIT predictions for the IC design, based on the second SER projections and second FIT predictions, using a third analytical performance model of the IC design; and
   generating fourth SER projections and fourth FIT predictions for the IC design using a fourth analytical performance model of the IC design based on the third SER projections and third FIT predictions for the IC design.

9. The method of claim 8, wherein the first phase of development of the IC design is a pre-concept phase, the second phase of development of the IC design is a concept phase, the third analytical performance model of the IC design is created at a high-level design phase of development of the IC design, and the fourth analytical performance model of the IC design is created at a register transfer level (RTL) implementation phase of development of the IC design.

10. The method of claim 1, wherein:
    generating the first SER projections and first FIT predictions for the IC design comprises:
    associating the first analytical performance model with a first IC chip SER workload modeling engine; and
    running the first IC chip SER workload modeling engine to combine together latch/cell types and counts, latch/cell vulnerability data, and active workload residency data to produce the first SER projections, and
    generating the second SER projections and second FIT predictions of the IC design comprises:
    associating the second analytical performance model with a second IC chip SER workload modeling engine; and running the second IC chip SER workload modeling engine to combine together latch/cell types and counts, latch/cell vulnerability data, and active workload residency data to produce the second SER projections.

11. A computer program product comprising a non-transitory computer readable storage medium having a computer readable program stored thereon, wherein the computer readable program, when executed on a computing device, causes the computing device to:
integrate device-level and component-level soft error rate (SER) analysis mechanisms with micro-architecture level performance analysis tools during a concept phase of an integrated circuit (IC) design to thereby generate a soft error rate (SER) analysis tool;
generate a first SER profile for the IC design by applying the SER analysis tool to the IC design;
obtain, at a later phase of the IC design, detailed information about SER vulnerabilities of logic and storage elements within the IC design;
refine the first SER profile at the later phase of the IC design based on the detailed information about SER vulnerabilities of the logic and storage elements within the IC design to thereby generate a second SER profile for the IC design, wherein modifications to the IC design are made at one or more phases of the IC design based on one of the first SER profile or the second SER profile, wherein the computer readable program causes the computing device to generate the first SER profile by:
creating a first analytical performance model of the IC design, wherein the first analytical performance model of the IC design is created at the concept phase of development of the IC design; and
generating first SER projections and first failures in time (FIT) predictions for the IC design using the first analytical performance model of the IC design, wherein the first SER projections and first FIT predictions are generated by a SER workload modeling engine of the SER analysis tool, and wherein the SER workload modeling engine collects SER values for each of a plurality of components of the IC design based on average data residency statistics for the components of the IC design, and combines the SER values to generate a raw SER value for the IC design.

12. The computer program product of claim 11, wherein the computer readable program causes the computing device to refine the first SER profile to generate a second SER profile for the IC design by:
creating a second analytical performance model of the IC design, wherein the second analytical performance model of the IC design is created at a second phase of development of the IC design that is later in time than the concept phase of development of the IC design; and
generating second SER projections and second FIT predictions for the IC design using the second analytical performance model of the IC design based on the first SER projections and first FIT predictions for the IC design.

13. The computer program product of claim 11, wherein the computer readable program causes the computing device to collect SER values for each of the plurality of components by:
collecting raw SER contributions from combinational logic, latches, and storage structures, if any, for each of the components in the plurality of components to generate a total worst case raw FIT value for the IC design; and
de-rating the total worst case raw FIT value for the IC design based on an identification of elements within the components that do not or cannot contribute to the raw SER value of the IC design.

14. The computer program product of claim 13, wherein the computer readable program causes the computing device to de-rate the total worst case raw FIT value for the IC design by de-rating the total worst case raw FIT value based on a planned protected latch ratio and a protected cell ratio of the IC design.

15. The computer program product of claim 11, wherein the SER workload modeling engine determines average data residency statistics by one of instrumenting an IC micro-architecture simulator with residency data gathering instructions or capturing a scroll pipe output of a performance run of the IC micro-architecture simulator and gathering residency data from the scroll pipe output.

16. The computer program product of claim 11, wherein the modifications to the IC design comprises at least one of determining more robust options for the IC design through identification of high-vulnerability structures in the IC design or performing a trade-off analysis for modifying the IC design.

17. The computer program product of claim 11, wherein the first SER projections and first FIT predictions are used in a loop-back manner to improve the second SER projections and second FIT predictions.

18. The computer program product of claim 11, wherein the computer readable program further causes the computing device to:
generate third SER projections and third FIT predictions for the IC design, based on the second SER projections and second FIT predictions, using a third analytical performance model of the IC design; and
generate fourth SER projections and fourth FIT predictions for the IC design using a fourth analytical performance model of the IC design based on the third SER projections and third FIT predictions for the IC design.

19. The computer program product of claim 11, wherein the computer readable program causes the computing device to generate the first SER projections and first FIT predictions for the IC design by:
associating the first analytical performance model with a first IC chip SER workload modeling engine; and
running the first IC chip SER workload modeling engine to combine together latch/cell types and counts, latch/cell vulnerability data, and active workload residency data to produce the first SER projections; and wherein the computer readable program causes the computing device to generate the second SER projections and second FIT predictions of the IC design by:
associating the second analytical performance model with a second IC chip SER workload modeling engine; and
running the second IC chip SER workload modeling engine to combine together latch/cell types and counts, latch/cell vulnerability data, and active workload residency data to produce the second SER projections.

20. An apparatus, comprising:
a processor, and
a memory coupled to the processor, wherein the memory comprises instructions which, when executed by the processor, cause the processor to:
integrate device-level and component-level soft error rate (SER) analysis mechanisms with micro-architecture level performance analysis tools during a concept phase of an integrated circuit (IC) design to thereby generate a soft error rate (SER) analysis tool;
generate a first SER profile for the IC design by applying the SER analysis tool to the IC design;
obtain, at a later phase of the IC design, detailed information about SER vulnerabilities of logic and storage elements within the IC design; and
refine the first SER profile at the later phase of the IC design based on the detailed information about SER vulnerabilities of the logic and storage elements within the IC design to thereby generate a second SER profile for the IC design, wherein modifications to the IC design are made at one or more phases of the IC design based on one of the first SER profile or the second SER profile, wherein the instructions further cause the processor to generate the first SER profile by:
creating a first analytical performance model of the IC design, wherein the first analytical performance model of the IC design is created at the concept phase of development of the IC design; and
generating first SER projections and first FIT predictions for the IC design using the first analytical performance model of the IC design, wherein the first SER projections and first FIT predictions are generated by a SER workload modeling engine of the SER analysis tool, and wherein the SER workload modeling engine collects SER values for each of a plurality of components of the IC design based on average data residency statistics for the components of the IC design, and combines the SER values to generate a raw SER value for the IC design.

* * * * *